(12) United States Patent
Cueto et al.

(10) Patent No.: US 9,739,048 B2
(45) Date of Patent: Aug. 22, 2017

(54) TELESCOPIC STRUCTURAL SYSTEMS AND CONSTRUCTION METHOD

(71) Applicants: Jorge Cueto, Amherst, NY (US); Maria Garzon, Amherst, NY (US)

(72) Inventors: Jorge Cueto, Amherst, NY (US); Maria Garzon, Amherst, NY (US)

(*) Notice: Subject to any disclaimer, the term of this patent is extended or adjusted under 35 U.S.C. 154(b) by 0 days.

(21) Appl. No.: 15/354,461

(22) Filed: Nov. 17, 2016

(65) Prior Publication Data

US 2017/0138038 A1    May 18, 2017

Related U.S. Application Data

(60) Provisional application No. 62/256,937, filed on Nov. 18, 2015.

(51) Int. Cl.
*B66C 23/06* (2006.01)
*B66C 23/62* (2006.01)
(Continued)

(52) U.S. Cl.
CPC ...... *E04B 1/34305* (2013.01); *E04B 1/34384* (2013.01); *E04B 2/42* (2013.01); *E04C 3/005* (2013.01); *E04B 1/3431* (2013.01); *E04B 1/34315* (2013.01); *E04B 1/34331* (2013.01); *E04B 1/34336* (2013.01); *E04B 1/34363* (2013.01); *E04B 1/34373* (2013.01);
(Continued)

(58) Field of Classification Search
CPC ......... E04B 1/3431; E04B 2001/34389; E04B 1/34315; E04B 1/34336; E04B 1/34331; E04B 1/34373; E04B 1/34363; E04B 1/34305; E04B 2/42; E04B 1/34384; E04B 2001/343946; E04C 3/005; E04H 12/182; E04H 12/185; F16M 11/28; H01Q 1/10; H01Q 1/1235; H01Q 1/1257
USPC ......... 52/126.3, 67, 143, 71, 72, 122.1, 111, 52/118, 64
See application file for complete search history.

(56) References Cited

U.S. PATENT DOCUMENTS 3,474,833 A * 10/1969 Garrette, Jr. ............ F16B 7/105
138/120
3,555,748 A * 1/1971 Herman ............... E04B 1/34305
52/121
(Continued)

*Primary Examiner* — Chi Q Nguyen
(74) *Attorney, Agent, or Firm* — Vincent G. LoTempio; Kloss, Stenger & LoTempio; David T. Stephenson

(57) ABSTRACT

A telescoping barrier assembly provides interlocking modules coupled together so as to slide vertically with respect to the other. The modules telescopically extend to a deployed position to form a barrier that withstands inertial and the external forces, and then retracts to a collapsed position. The modules include a base module and a plurality of deployable modules that are arranged in a nested configuration, such that each module slides in and out of an adjacent module. The base module has a mounting portion that may be subterranean. A lifting mechanism applies an axial force to the deployable modules to enable displacement between the operational and collapsed position. Spring biased lateral support members help the deployable modules remain in the extended position and a pulley system helps displace the modules to the collapsed position. An inner and outer seal inhibit liquid leakage between the module and between multiple adjacent assemblies.

20 Claims, 18 Drawing Sheets

(51) Int. Cl.
  *E04H 12/34* (2006.01)
  *E04B 1/343* (2006.01)
  *E04B 2/42* (2006.01)
  *E04C 3/00* (2006.01)
  *F16M 11/28* (2006.01)
  *H01Q 1/12* (2006.01)
  *E04H 12/18* (2006.01)
  *H01Q 1/10* (2006.01)

(52) U.S. Cl.
  CPC .............. *E04B 2001/34389* (2013.01); *E04B 2001/34394* (2013.01); *E04H 12/182* (2013.01); *E04H 12/185* (2013.01); *F16M 11/28* (2013.01); *H01Q 1/10* (2013.01); *H01Q 1/1235* (2013.01); *H01Q 1/1257* (2013.01)

(56) References Cited

U.S. PATENT DOCUMENTS

| | | | |
|---|---|---|---|
| 3,832,810 A * | 9/1974 | Johnston | E04B 2/74 52/67 |
| 4,062,156 A * | 12/1977 | Roth | B64G 1/22 343/883 |
| 4,279,540 A | 7/1981 | Suga | |
| 5,101,215 A * | 3/1992 | Creaser, Jr. | E04H 12/182 343/883 |
| 5,315,795 A * | 5/1994 | Chae | B66F 11/00 343/874 |
| 5,333,422 A * | 8/1994 | Warren | E04H 12/182 52/115 |
| 5,615,855 A * | 4/1997 | Marue | B60P 3/18 248/188.5 |
| 5,645,373 A | 7/1997 | Jenkins | |
| 5,988,946 A | 11/1999 | Reed | |
| 6,004,067 A | 12/1999 | Peppard | |
| 6,151,840 A * | 11/2000 | Simison | E04B 1/34305 52/123.1 |
| 6,513,769 B1 * | 2/2003 | Chapman | F16F 15/073 248/125.1 |
| 6,588,979 B1 | 7/2003 | Pasij | |
| 2013/0239490 A1 * | 9/2013 | Peng | E04B 1/34305 52/111 |
| 2014/0174016 A1 * | 6/2014 | Diniz | E04H 12/182 52/632 |
| 2015/0292194 A1 * | 10/2015 | Calafatis | E04B 1/34305 52/67 |

* cited by examiner

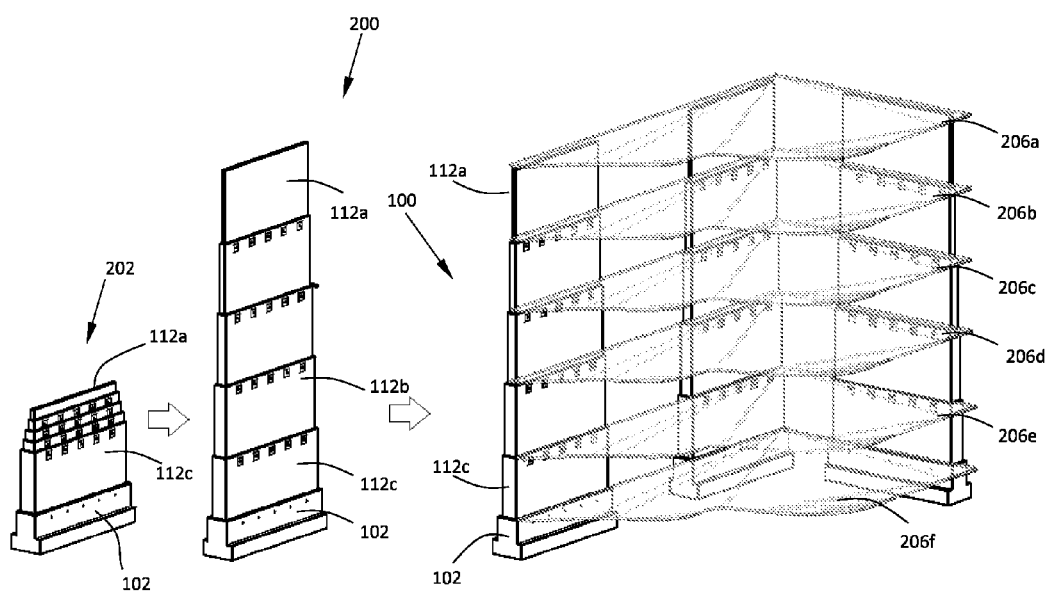

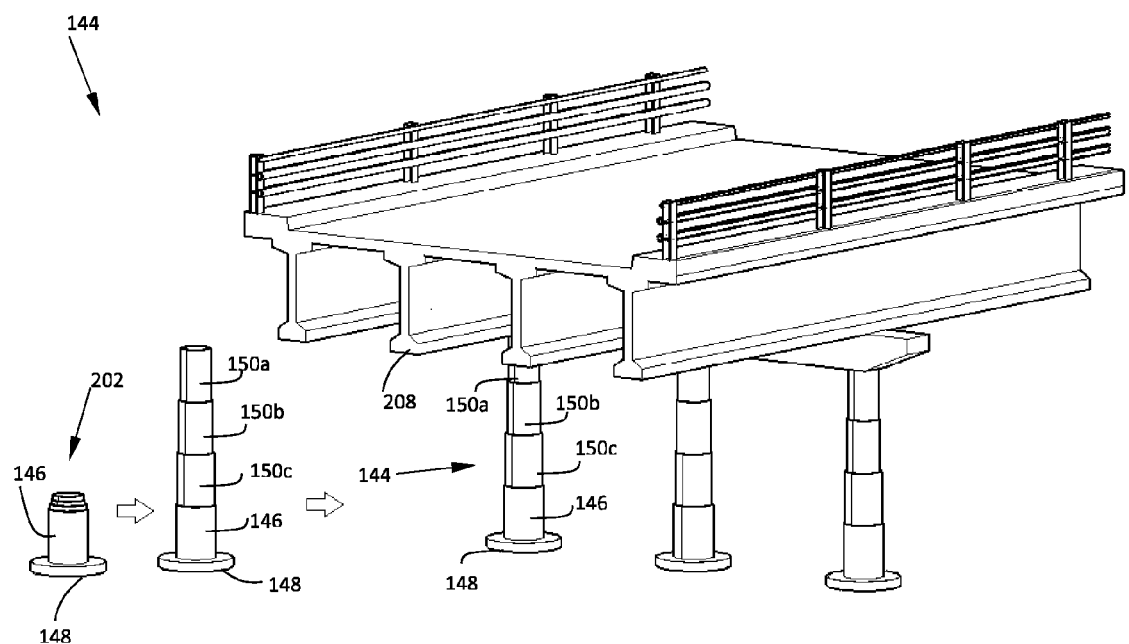

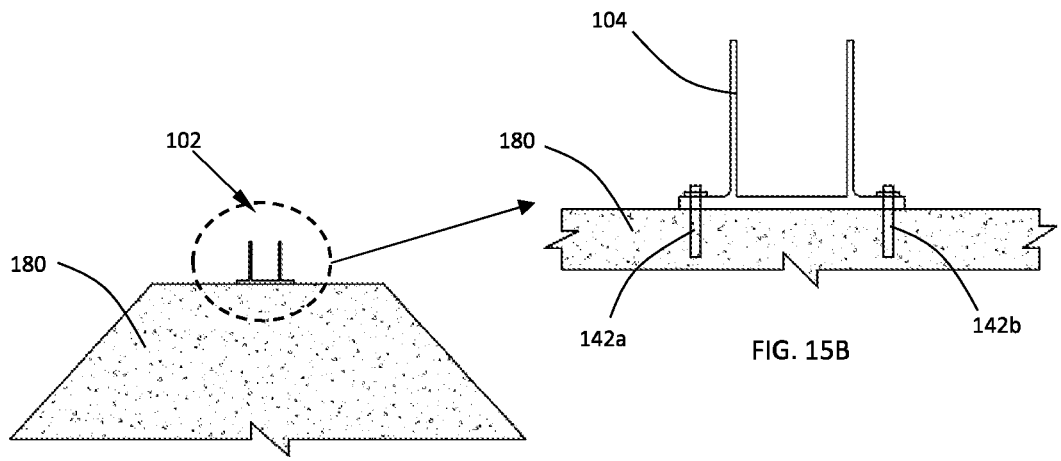
FIG. 15A
FIG. 15B
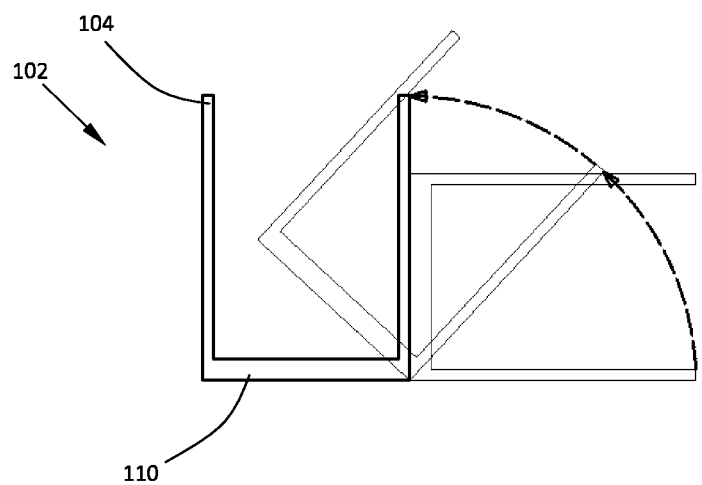
FIG. 16

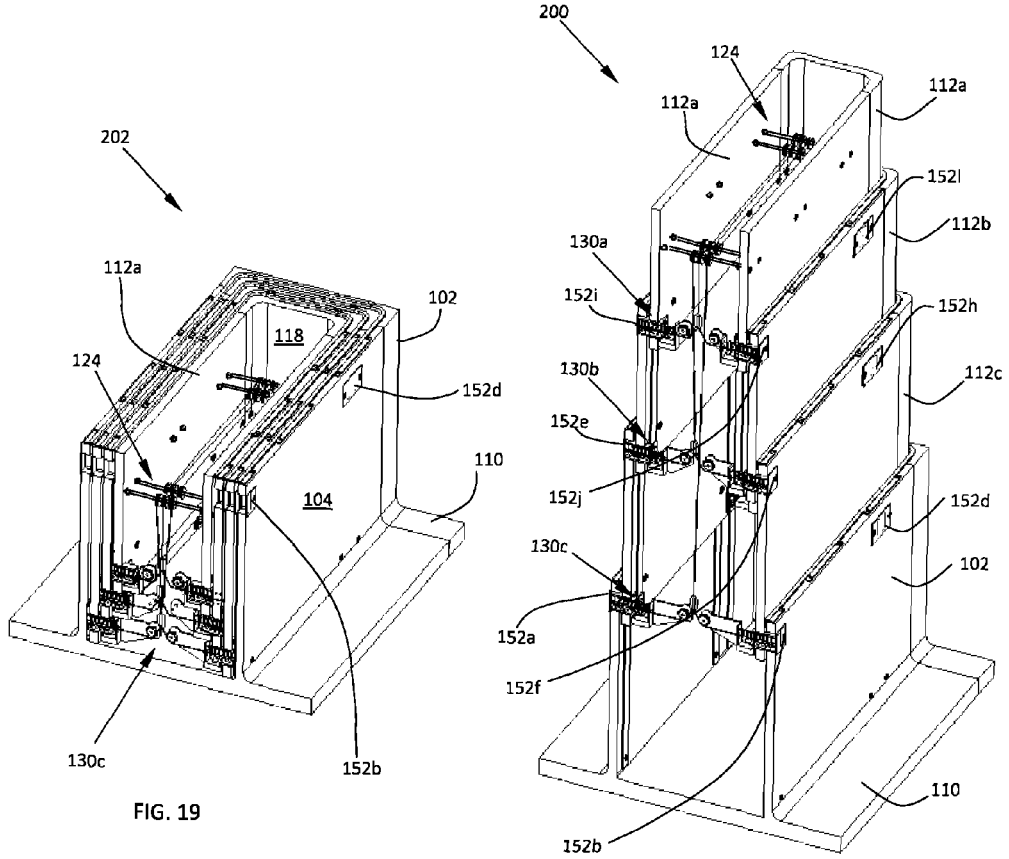

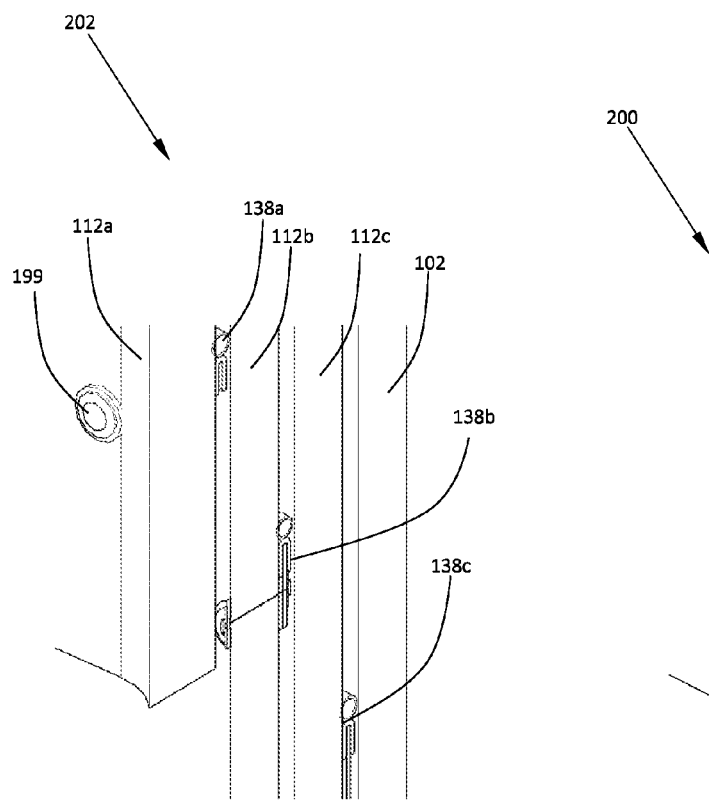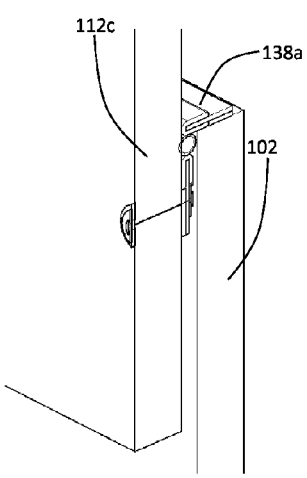
FIG. 25
FIG. 26

TELESCOPIC STRUCTURAL SYSTEMS AND CONSTRUCTION METHOD

CROSS REFERENCE OF RELATED APPLICATIONS

This application claims the benefits of U.S. provisional application No. 62/256,937, filed Nov. 18, 2015 and entitled TELESCOPIC STRUCTURAL SYSTEMS AND CONSTRUCTION METHOD, which provisional application is incorporated by reference herein in its entirety.

FIELD OF THE INVENTION

The present invention relates generally to a telescoping barrier assembly. More so, a telescoping barrier assembly provides a telescoping barrier assembly that telescopically extends to a deployed position to form a barrier that withstands inertial and the external forces, and retracts to a collapsed position; whereby the assembly comprises a nested configuration of interlocking modules coupled together so as to slide vertically with respect to the other, including a base module having mounting portion that forms a foundation and a plurality of deployable modules are arranged in a nested configuration; whereby each module is configured to slide in and out of an adjacent module; whereby a lifting mechanism applies an axial force to the deployable modules to move between the operational and collapsed position. Each module comprises a first end having a first terminal opening, and a second end having a second terminal opening. Whereby each module comprises a pair of spring biased lateral support members that moves along an adjacent module until passing through a first terminal opening to lock into the deployed position, or the second terminal opening to lock into the collapsed position; whereby an inner and outer seal inhibit liquid leakage between the module and between multiple adjacent assemblies. The extended position can be permanently or temporarily; either way, the deployable modules in the extended position are intended to withstand the inertial and the external forces applied to it. In the temporarily extended case and after the need for the structural element has ceased, the deployable modules will telescopically go back to its retracted configuration. The modules will be comprised by a plurality of mechanisms which functionality will vary depending on the intended use of the structural element in its extended position.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, flooding occurs when run off surface water from sustained and heavy rain, or overspill from streams or rivers, overwhelms water drainage, removal systems and flood containment plains. In some areas flooding is compounded by incoming high tides backing up the river water and occurring in sequence with higher raised levels of body of water, such as lakes, rivers, reservoirs, and the like. This causes overspill onto the surrounding land.

There are different types of flood barriers including those which prevent localized flooding and prevent ingress of water into premises, and diversion barriers which direct water away from premises, habitation, or restrict tidal flow. The majority of diversion barriers are permanent solid-state wall barriers constructed from stone or brick etc. In some cases earth mounds can be formed on riverbanks to divert water away from premises and habitation. In some instances, dumping solid-state material to raise land levels can also be used to form sea barriers.

It is known that telescoping is the movement of one part sliding out from another, lengthening an object from its rest state. Telescopic structures are designed with a series of rectangular members or tubes of progressively smaller diameters nested within each other. The largest diameter sleeve is called the main or barrel. The smaller inner sleeves are called the stages.

Other proposals have involved flood barriers. The problem with these is that they do not telescopically collapse to fit in with the environment, and then extend to an operational position. Also, they do not have sufficient sealing members to prevent leakage between components of the barrier. Even though the above cited flood barriers and walls meet some of the needs of the market, a telescoping barrier assembly that telescopically extends to a deployed position to form a barrier that withstands inertial and the external forces, and retracts to a collapsed position, and comprising of a nested configuration of interlocking modules coupled together so as to slide vertically with respect to the other, and further a lifting mechanism applies an axial force to the deployable modules to move between the operational and collapsed position, and a pair of spring biased lateral support members work to interlock the modules in the deployed position, and a pulley system is operational with a pair of spring biased lateral support members to displace the modules to the collapsed position, and an inner and outer seal that inhibit liquid leakage between the module and between multiple adjacent assemblies, is still desired.

SUMMARY

Illustrative embodiments of the disclosure are generally directed to a telescoping barrier assembly that provides a series of nested modules that extend to a deployed position to form a permanent or temporary barrier that can withstands inertial and the external forces, such as floods, and also retracts to a collapsed position, either subterranean or above the ground surface, when not in use.

In one embodiment, the assembly comprises a nested configuration of interlocking modules coupled together, so as to slide vertically with respect to the other. The modules may include a base module having a mounting portion that forms a foundation for the assembly. The modules may also include a plurality of deployable modules that may be configured in progressively smaller sizes to nest together, whereby each deployable module is configured to slide in and out of an adjacent module.

In one embodiment, the assembly leverages the axial force of a lifting device to axially displace the deployable modules to the deployed position. A lifting mechanism extends between the base module and an innermost deployable module, and applies an axial force to the deployable modules to create axial displacement between the operational and collapsed position.

In some embodiments, an inner and outer seal inhibit liquid leakage between the modules, and also between multiple adjacent assemblies.

In some embodiments, the assembly may include a base module comprising a mounting portion and a continuous base sidewall. The base sidewall is defined by a base opening and a base cavity. The base module may be at least partially hollow. The base module is scalable and may follow a generally rectangular shape, straight shape, or a curved shape. The mounting portion may be positioned subterranean or on the ground surface.

In some embodiments, the assembly may further include a plurality of deployable modules arranged in a nested configuration in relation to each other and the base module. The deployable modules are configured to slide vertically with respect to the other, so as to extend to a deployed position and retract into a collapsed position. The nested configuration of deployable modules has an innermost deployable module that is the smallest and most inner deployable module. The base module is the outermost module, encapsulating all of the deployable modules.

The deployable modules comprise a continuous deployable sidewall. The deployable sidewall is defined by an inner surface, an outer surface, and a deployable cavity. During displacement of the modules, an inner surface of each deployable module slidably engages an outer surface of an adjacent module. The deployable modules are scalable and may follow a generally rectangular shape, straight shape, or a curved shape.

In one embodiment, the first end of each deployable module is defined by a first terminal opening that may also include a spring biased lateral support member. The second end of each deployable modules comprises a second terminal opening. First and second terminal openings are configured to receive guide member.

The spring biased lateral support member is configured to protrude from the inner lateral sides of the deployable module. In one embodiment, the spring biased lateral support member is a rod or a block and may be biased to urge outwardly from the deployable modules. Due to the bias, the spring biased lateral support member enters on the second terminal openings upon alignment therewith.

In some embodiments, the assembly may include a pair of spring biased lateral support members that are operational on each deployable sidewall. The pair of spring biased lateral support members are disposed opposite each other in alignment on the inner surface of each deployable module. The spring biased lateral support members comprise a spring and a spring conduit.

As each deployable module extends to the deployed position, the spring is biased to expand from the inner surface of the deployable sidewall. Conversely, as each deployable module retracts to the collapsed position, the spring is compressed by an outer deployable module towards the inner surface of the deployable sidewall. It is also significant to note that each deployable module has a unique cable and pulley portion that operatively connect to the spring biased lateral support member of each deployable module. In this manner, the deployable modules extend and retract incrementally.

In some embodiments, the assembly may include a pulley system that is operational with the spring biased lateral support members. The pulley system may include a pulley portion and at least one cable. The pulley portion may include a series of pulleys arranged in a parallel disposition and extending between the deployable sidewall of the innermost deployable sidewall. The at least one cable may include a cable that is operational for each deployable module.

In some embodiments, the pulley system may include a pulley portion and at least one cable. When the cable is pulled, the spring biased support member is forced to move inwards from the second terminal opening and makes the deployable modules to return to the collapsed position.

In some embodiments, the assembly may include a pair of guide rails disposed on the inner surface of each deployable sidewall. The guide rails are configured to engage the outer surface of an adjacent deployable module, such that the deployable modules remain aligned while being displaced between the deployed position and the collapsed position.

In some embodiments, the guide rails may serve as well to enhance the strength of the sidewalls of the deployable modules or the base modules by working together with the sidewall constituent material.

In some embodiments, the assembly may include a lifting device extending between the base module and the innermost deployable module. The lifting device is configured to apply an axial force to the innermost deployable module, so as to enable telescoping extension of the plurality of deployable modules relative to the base module. In one embodiment, the lifting device is a scissor lifting mechanism.

In some embodiments, the assembly may include an inner sealing member disposed between the inner surface of each deployable module. The inner sealing member is configured to position between two or more adjacent deployable modules.

In some embodiments, the assembly may include an outer sealing member disposed between the outer surface of each deployable module. The outer sealing member configured to position between two or more adjacent assemblies.

In some embodiments, the assembly may include a sensor configured to actuate the lifting device upon detection of an event. The event may include a flood, whereby the deployable modules are lifted and pulled to the deployed position.

One objective of the present invention is to provide a telescoping barrier that extends to withstand inertial and the external forces, such as localized flooding, preventing ingress of water into premises, and diversion barriers which direct water away from premises, habitation, or restrict tidal flow.

Another objective is to enable retraction of the telescoping barrier to a collapsed position, either subterranean or on the surface of the ground Another objective is to provide a permanent or temporary structure.

Yet another objective is to guide the deployable modules in alignment with guide rails.

Yet another objective is to provide sensing means to detect events, such as floods or traffic congestion for actuating the barrier assembly to the deployed position.

Yet another objective is to provide inner sealing members to inhibit leakage between modules.

Yet another objective is to provide outer sealing members to inhibit leakage between multiple barrier assemblies.

Yet another objective is to leverage the axial force of a lifting device and tensioned forces of a spring to axially displace the deployable modules to the deployed position.

Yet another objective is to move between the operational and collapsed positions to save space, adapt to changing conditions, and maintain an inconspicuous structure.

Yet another objective is to provide an inexpensive to manufacture telescoping barrier assembly for eclectic uses.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example as a subterranean flood barrier, with reference to the accompanying drawings, in which:

FIG. 1A is the barrier assembly in a collapsed position and FIG. 1B is the barrier assembly in a deployed position, in accordance with an embodiment of the present invention;

FIGS. 2A, 2B, and 2C illustrate perspective views of the telescoping barrier assembly shown in FIG. 1A being axially displaced and supporting at least one structure, where FIG. 2A is the barrier assembly in a collapsed position, FIG. 2B is the barrier assembly in a deployed position, and FIG. 2C shows multiple barrier assemblies supporting at least one structure, in accordance with an embodiment of the present invention;

FIGS. 3A, 3B, and 3C illustrate perspective views of an exemplary cylindrical telescoping barrier assembly having cylindrical modules being axially displaced and supporting a road structure, where FIG. 3A is the cylindrical barrier assembly in a collapsed position, FIG. 3B is the cylindrical barrier assembly in a deployed position, and FIG. 3C shows multiple cylindrical barrier assemblies supporting the road structure, in accordance with an embodiment of the present invention;

FIG. 7A illustrates a monolithic base module, FIG. 7B illustrates a sectioned base module having at least one stud to fasten the sidewall and the mounting portion, FIG. 7C illustrates a base module with tapered sidewalls, and FIG. 7D illustrates a base module with thicker sidewalls at the junction between the base sidewalls and the mounting portion, in accordance with an embodiment of the present invention;

FIGS. 15A and 15B illustrates a side view of a mounting portion fastened to an existing structure, where FIG. 15A shows the base module joined with a dam, and FIG. 15B shows the studs securing the base module to the dam, in accordance with an embodiment of the present invention;

FIG. 16 illustrates a sectioned view of a base module rotating, such that the deployable modules extend and retract horizontally or vertically, in accordance with an embodiment of the present invention;

FIG. 19 illustrates a sectioned perspective view of a base module with the deployable modules in a collapsed position, in accordance with an embodiment of the present invention;

FIG. 20 illustrates a sectioned perspective view of a base module the deployable modules axially displaced to a deployed position, in accordance with an embodiment of the present invention;

FIG. 24A shows a spring in a compressed position located within the first terminal opening of the deployable modules and being pushed towards the inner face of the sidewall of the adjacent deployable or base module, and FIG. 24B shows a spring in an expanded position and pushing the spring biased lateral support to fit in the second terminal opening of the deployable or base modules, in accordance with an embodiment of the present invention;

FIG. 25 illustrates a close up view of an exemplary inner sealing member between modules in a collapsed position, in accordance with an embodiment of the present invention;

FIG. 26 illustrates a close up view of the inner sealing member expanded between modules in a deployed position, in accordance with an embodiment of the present invention;

Like reference numerals refer to like parts throughout the various views of the drawings.

DETAILED DESCRIPTION OF THE INVENTION

Figures 1A, 1B:
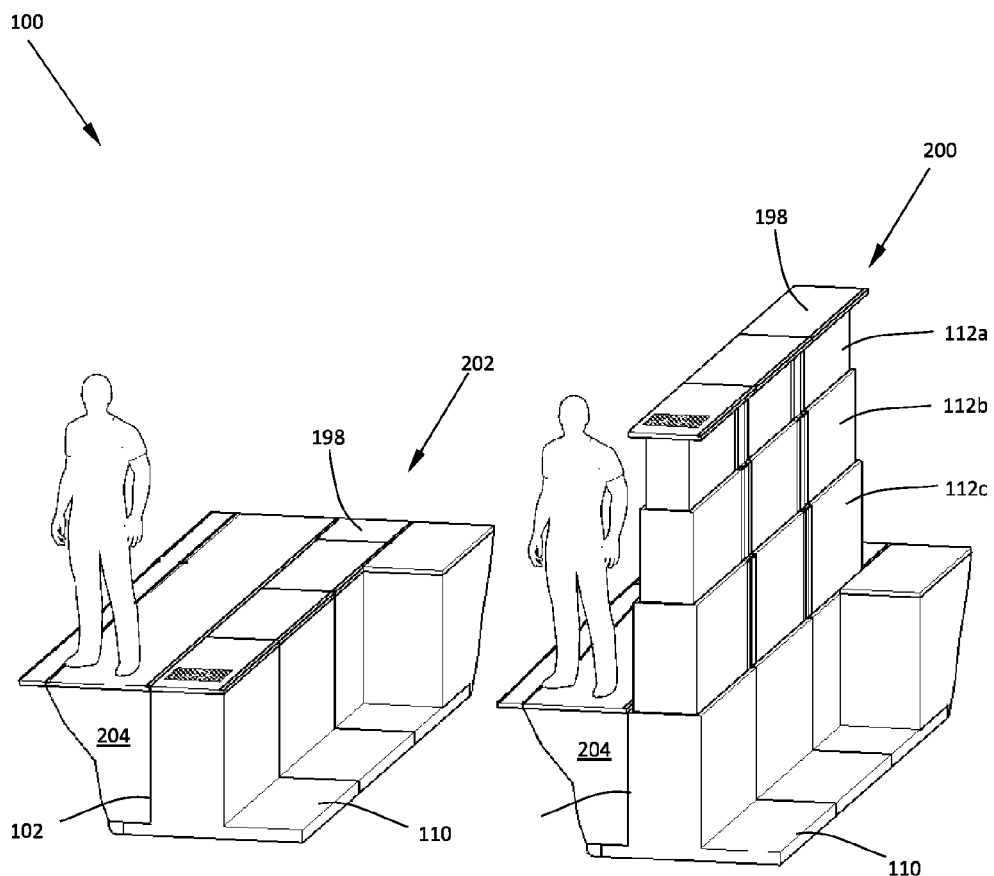
FIGS. 1A and 1B illustrate perspective views of an exemplary telescoping barrier assembly having rectangular modules, where

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1A. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

In one embodiment of the present invention presented in FIGS. 1A-28, a telescoping barrier assembly 100 provides a series of nested modules 102, 112a-c that incrementally extend to a deployed position 200 to form a permanent or temporary barrier that has sufficient lateral rigidity to withstand inertial and the external forces, such as floods. Telescoping barrier assembly 100 is also configured to incrementally retract to a collapsed position 202, either subterranean or above the ground surface 204, when not in use.

In one exemplary use of telescoping barrier assembly 100, hereafter "assembly 100" assembly 100, modules 112a-c extend to the deployed position 200 to provide a temporary solution for restricting the passage of water into a protected region during a flood. However in other embodiments, the deployed position 200 of assembly may be used for myriad other uses, depending on the dimensions and shape of the modules. For example, the assembly may support at least one structure 206a-f of floors in a building, or support a road or bridge structure 208. In either example, assembly 100 is raised and the structures 206a-f, 208 are then installed when assembly 100 is in its extended position. Assembly 100 also raises and lowers the respective structure 206a-f, 208 above ground surface 204.

As referenced in FIGS. 1A and 1B, assembly 100 comprises a nested configuration of interlocking modules 102, 112a-c that are coupled together. An axial force is applied to slide the modules vertically with respect to the other. In some embodiments, the modules may include a base module 102 having a mounting portion that forms a foundation for the assembly 100. The modules may also include a plurality of deployable modules 112a, 112b, 112c configured in progressively smaller sizes to nest together. Each deployable module 112c is configured to slide in and out of an adjacent module 112b between a deployed position 200 and a collapsed position 202. This telescoping adaptability provides numerous advantageous, especially for saving space, adapting to changing conditions, and maintaining an inconspicuous structure for various structures.

In one embodiment, the assembly 100 leverages the axial force of a lifting device 122 to axially displace the deployable modules 112a-c to the deployed position 200 (FIG. 1A). Lifting device 122 extends between the base module 102 and an innermost deployable module, and applies an axial force to the deployable modules 112a, 112b, 112c so the deployed position 200 is reached (FIG. 1B). After the need of having the deployable modules 112a, 112b, 112c in the position 200 has ceased, a pulley system 124 works with a spring biased lateral support member 130a-c to push inwards the spring biased lateral support members 130a-c so the deployable modules 112a, 112b, 112c are released from deployed position 200 and return to collapsed position 202.

In some embodiments, a top slab 198 may be used atop base module 102. Top slab 198 may be configured to substantially match the environment, so that in the collapsed position 200, the modules 102, 112a-c remain inconspicuous. For example, top slab 198 may comprise of a grass layer to match the grass of the environment when assembly 100 is in collapsed position 202.

In one embodiment, multiple assemblies may be arranged to support at least one structure 206a-f. FIGS. 2A-2C illustrate perspective views of assembly 100 being axially displaced and supporting the at least one structure 206a-f. In this illustration, FIG. 2A is assembly 100 in a collapsed position 202. FIG. 2B is the assembly 100 in a deployed position 200. And FIG. 2C shows multiple barrier assemblies supporting at least one structure 206a-f. Structure 206a-f may include a first panel 206a, a second panel 206b, a third panel 206c, a fourth panel 206d, a fifth panel 206e, and a sixth panel 206f that are arranged in a stacked, coplanar relationship. As the assemblies retract to the collapsed position 202, the structures 206a-f may be removed or stacked on top of each other. In one embodiment, panels are floors of a building.

Additional types of structures that can be supported by the assemblies are shown in FIGS. 3A-3C, which illustrate perspective views of an exemplary cylindrical telescoping barrier assembly 144 supporting a road structure 208. In one embodiment, cylindrical telescoping barrier assembly 144 comprises a cylindrical base module 146 having a cylindrical mounting portion 148, and a plurality of cylindrical deployable modules 150a, 150b, 150c that are axially displaced to the deployed position 200 to support the road structure 208. FIG. 3A illustrates cylindrical barrier assembly 144 in a collapsed position 202. FIG. 3B illustrates cylindrical barrier assembly 144 in a deployed position 200. FIG. 3C illustrates multiple cylindrical barrier assemblies supporting the road structure 208.

In some embodiments, a pair of spring biased lateral support members 130a-c have a spring 132 that is biased to extend and, thereby push the lateral support member outwards from the sidewall of one deployable module 112*a*, 112*b*, 112*c* to fit into the second terminal opening 152*a*-1 of the adjacent deployable module 112*a*, 112*b*, 112*c* or the base module 104. Thereby, spring biased lateral support members 130*a*-*c* also work to stabilize the deployable modules 112*a*, 112*b*, 112*c* in the axial direction by transferring the forces from one deployable module 112*a*, 112*b*, 112*c* to the adjacent deployable module 112*a*, 112*b*, 112*c* or to the base module 104.

At least one inner sealing member 138*a*-*c* positions between modules 102, 112*a*-*c* to prevent water leaks between gaps in the modules 112*a*-*c*. An outer sealing member 140 inhibits water leakage between multiple adjacent assemblies.

Figure 4:
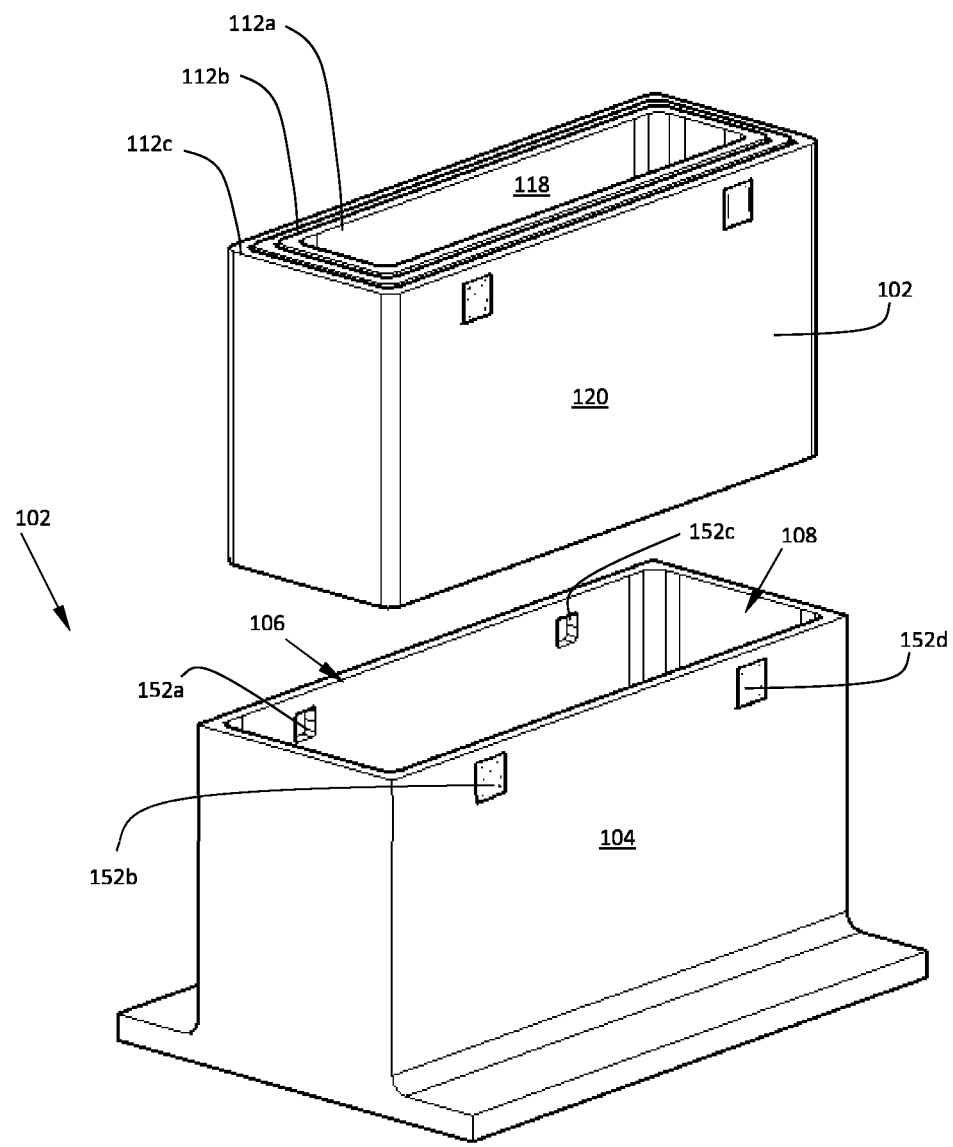
FIG. 4 illustrates a perspective views of an exemplary base module and a plurality of deployable modules, in accordance with an embodiment of the present invention.

Looking now at FIG. 4, assembly 100 may include a base module 102 comprising a mounting portion 110 and a continuous base sidewall 104. Base sidewall 104 is defined by at least one base terminal opening 152*a*, 152*b*, 152*c*, 152*d*, a base opening 106, and a base cavity 108 in which deployable modules 112*a*-*c* position in a nested configuration while in the collapsed position 202.

In some embodiments, base module 102 may be at least partially hollow. Base module 102 may also be scalable and follow a generally rectangular shape, straight shape, or a curved shape. The mounting portion 110 that supports base portion 102 may be positioned subterranean or above the ground surface 204, as shown below.

Figure 5:
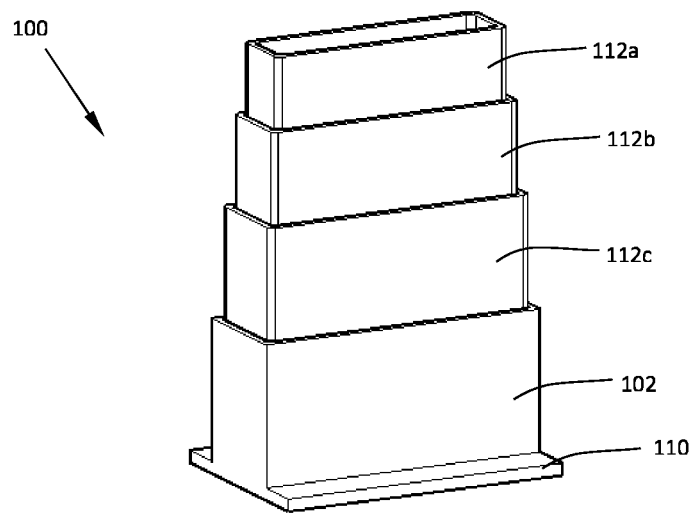
FIG. 5 illustrates a perspective view of a telescoping barrier assembly having straight rectangular modules, in accordance with an embodiment of the present invention.

In some embodiments, base module 102 forms the foundation for assembly 100. Base module 102 may take various forms. For example, FIG. 5 illustrates a perspective view of an assembly 100 having straight rectangular modules. The straight, rectangular configuration is effective for covering large surface area.

Figure 6:
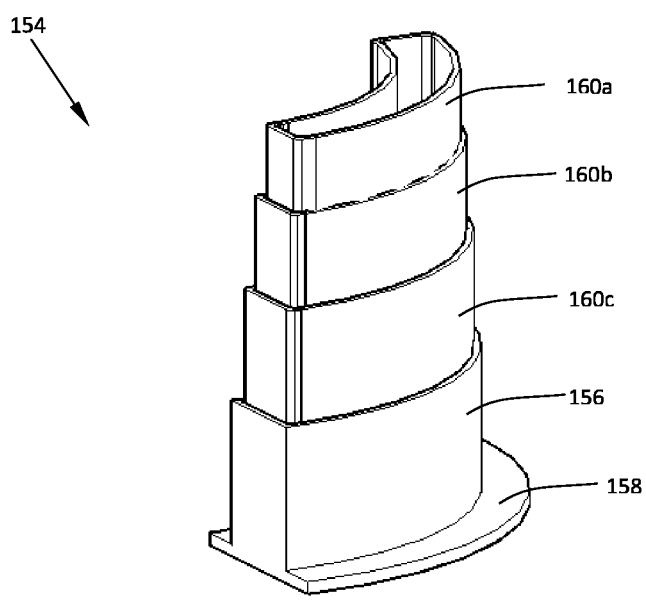
FIG. 6 illustrates a perspective view of a telescoping barrier assembly having curved modules, in accordance with an embodiment of the present invention.

However, another configuration of base module 102 is possible with a curved telescoping barrier assembly 154. FIG. 6 illustrates a perspective view of a curved telescoping barrier assembly 154 having a curved base module 156 with a curved mounting portion 158, and a plurality of curved deployable modules 160*a*, 160*b*, 160*c* that are axially displaced to the deployed position 200. The radius of the curve for modules 156, 160*a*-*c* may be determined based on the function and dimensions of curved assembly 154. However in other embodiments, the shape of base module 102 and the plurality of deployable modules 112*a*-*c* may include, without limitation, rectangular, circular, oval, square, and hexagonal.

Figure 7A:
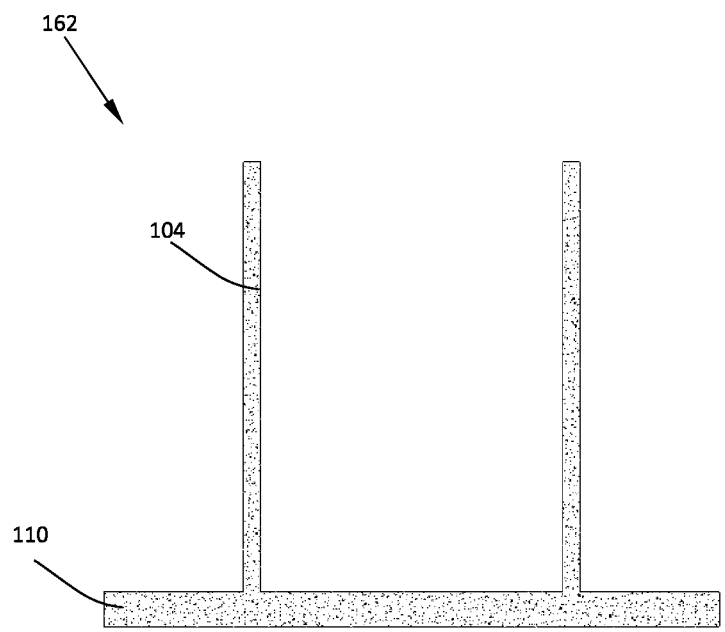
FIGS. 7A, 7B, 7C, and 7D illustrate sectioned views of different types of base modules, where

FIGS. 7A-7D illustrate sectioned views of different types of base modules. The various shapes are adaptable to different environments and to different types and amounts of loads. For example, FIG. 7A illustrates a monolithic base module 162 with the base sidewall 104 and mounting portion 110 forming a unitary body. This embodiment is a single component requiring minimal assemblage or maintenance.

Figure 7B:
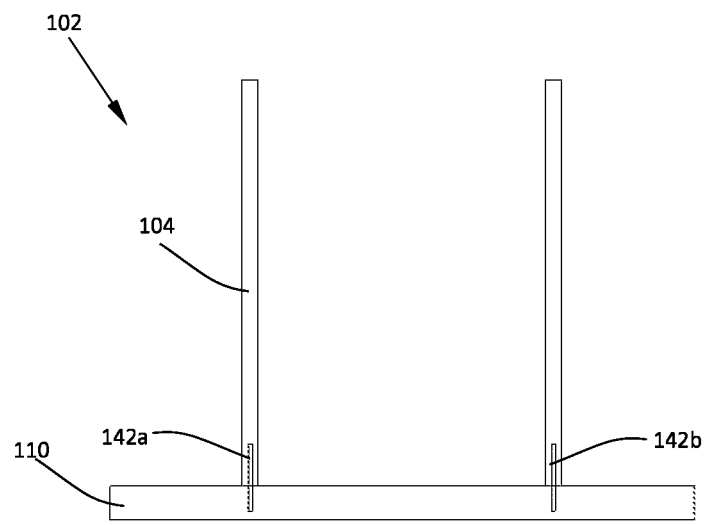
Figure 7C:
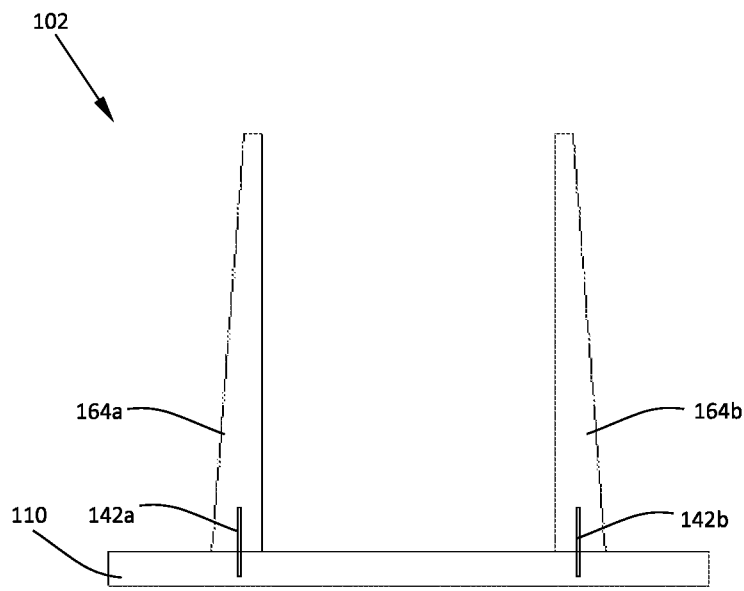
Figure 7D:
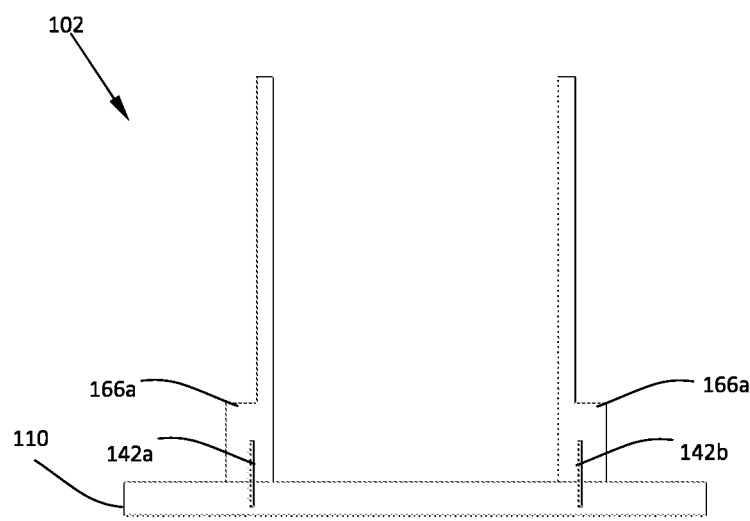

FIG. 7B illustrates a sectioned view of a base module 102 having at least one stud 142*a*, 142*b* that is configured to fasten the base sidewall 104 and the mounting portion 110 together. FIG. 7C illustrates a base module 102 with tapered sidewalls 164*a*, 164*b*. FIG. 7D illustrates a base module 102 with thickened sidewalls 166*a*, 166*b* at the junction between sidewalls 104 and mounting portion 110.

Those skilled in the art will recognize that by utilizing tapered and thickened sidewalls 164*a*-*b*, 166*a*-*b*, the base cavity 108 of base module 102 may acquire a shape that reinforces the connecting area between sidewalls 164*a*-*b*, 166*a*-*b* and mounting portion 110. Deployable modules 112*a*-*c* may have progressively smaller sizes to nest together. This enables a telescoping, stacked arrangement between modules 112*a*-*c*. The incrementally different sizes of deployable modules 112*a*-*c* also form a snug fit between each module 112*a*-*c*. This tight tolerance helps form a seal to restrict passage of liquid during flooding.

Figure 8:
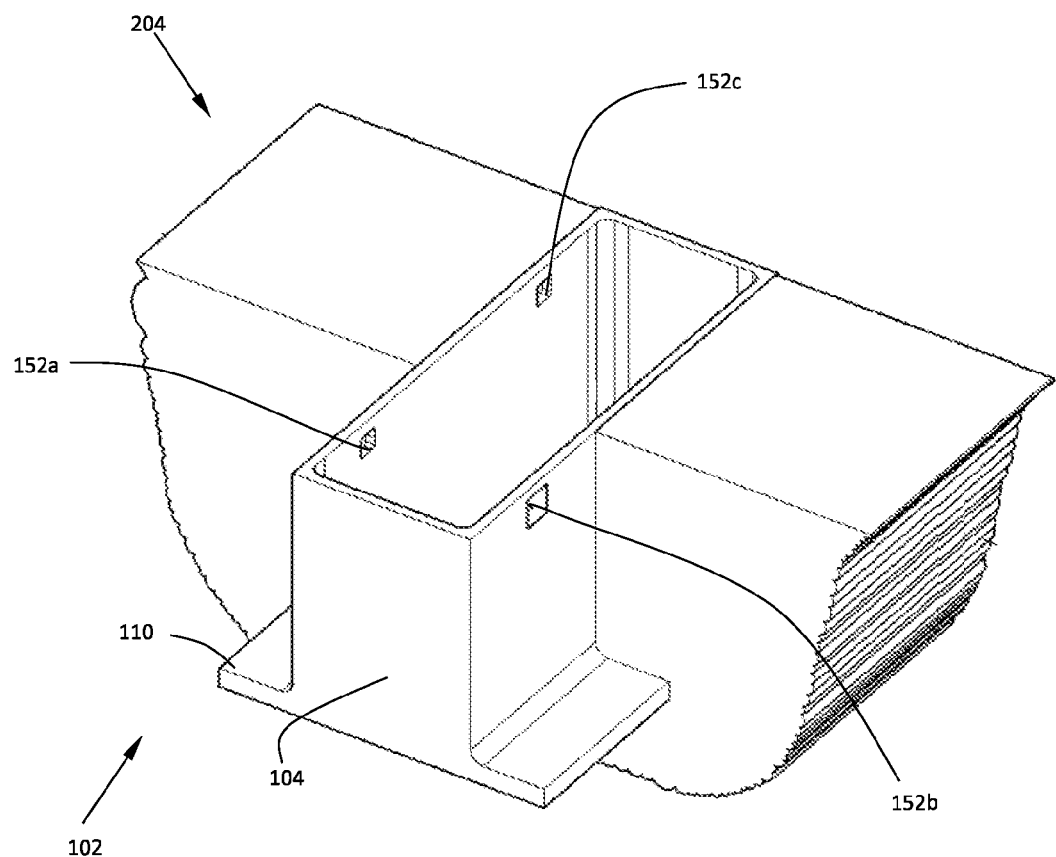
FIG. 8 illustrates a sectioned view of a base module with the mounting portion in a subterranean position, in accordance with an embodiment of the present invention.

As discussed above, base module 102, and specifically mounting portion 110 may be buried beneath ground surface 204 to provide greater stability to modules 102, 112*a*-*c*. FIG. 8 illustrates a sectioned view of a base module 102 with the mounting portion 110 buried beneath ground surface 204 in a subterranean position. The depth of mounting portion 110 below ground surface 204 may be altered depending on requirements of structural support 206*a*-*f*.

Figure 9:
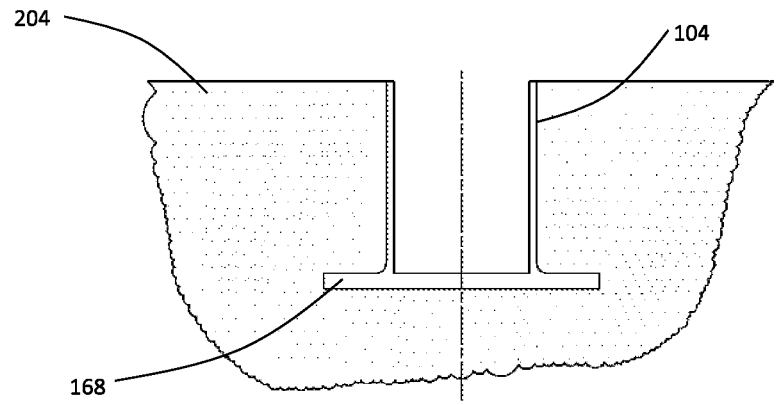
FIG. 9 illustrates a sectioned view of a symmetrical mounting portion in a subterranean position, in accordance with an embodiment of the present invention.
Figure 10:
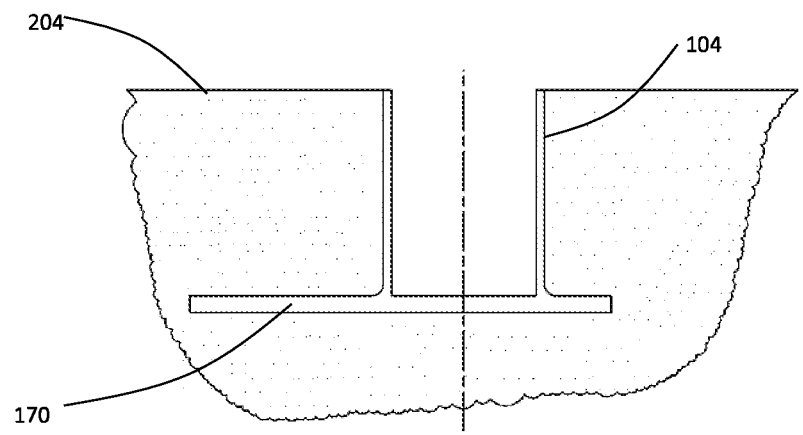
FIG. 10 illustrates a sectioned view of an asymmetrical mounting portion in a subterranean position, in accordance with an embodiment of the present invention.

In some embodiments, the shape of mounting portion 110 may be altered to provide different types of load bearing capacities. FIG. 9 illustrates a sectioned view of a symmetrical mounting portion 168 in a subterranean position in which mounting portion 168 is aligned with central axis of sidewalls 104. FIG. 10 illustrates a sectioned view of an asymmetrical mounting portion 170 in a subterranean position in which one side of mounting portion 110 is extended to support one side of base module 102.

Figure 11:
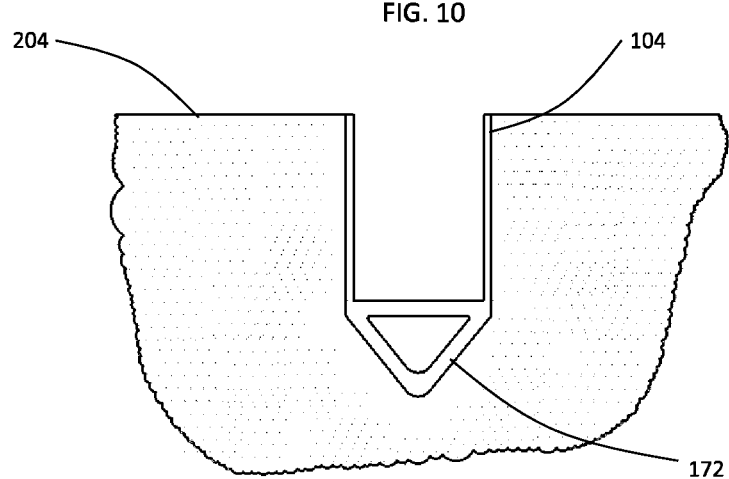
FIG. 11 illustrates a sectioned view of a wedge shaped mounting portion in a subterranean position, in accordance with an embodiment of the present invention.
Figure 12:
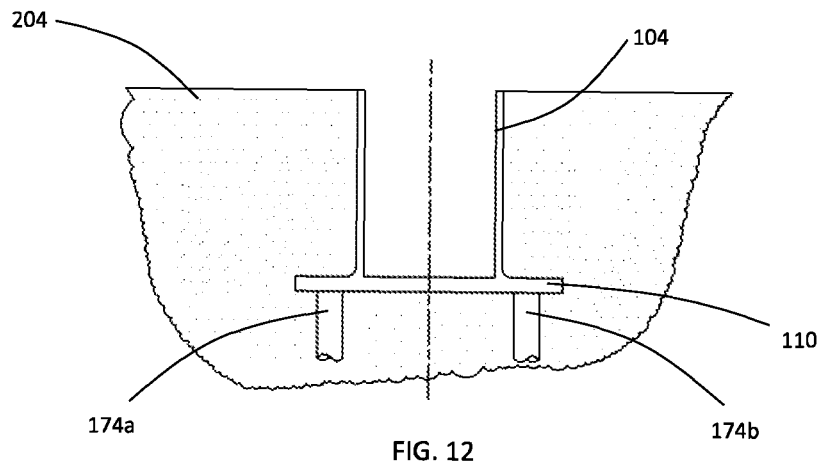
FIG. 12 illustrates a sectioned view of a mounting portion having two piles to bear the load, in accordance with an embodiment of the present invention.

In some embodiments, may conform to the shape needed to transfer a load to the ground surface 204. For example, a wedge shaped mounting portion 172 may be used, such that the base module 102 can be driven into the ground and minimize of avoid the need of excavation. FIG. 11 illustrates a sectioned view of this wedge shaped mounting portion 172 in a subterranean position. FIG. 12 illustrates a sectioned view of a mounting portion 110 having two piles 174*a*, 174*b* to bear the load and provide strength and stability to modules 102, 112*a*-*c*.

Figure 13:
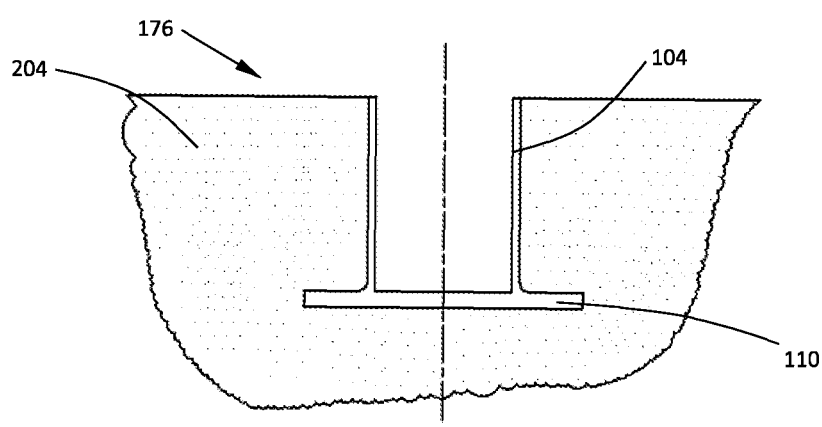
FIG. 13 illustrates a sectioned view of a mounting portion fully buried under a ground surface, in accordance with an embodiment of the present invention.
Figure 14:
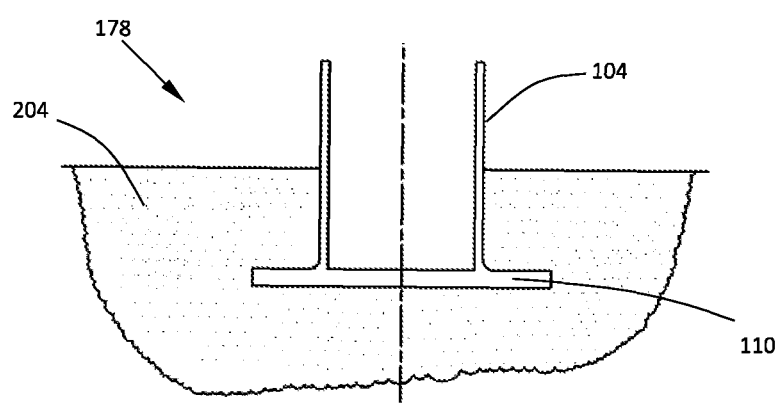
FIG. 14 illustrates a sectioned view of a mounting portion partially buried under a ground surface, in accordance with an embodiment of the present invention.

In some embodiments, mounting portion 110 may be disposed in various positions relative to the ground surface 204, including: above the ground surface 204, fully buried 176 in a subterranean position, or partially buried 178 in a subterranean position. For example, FIG. 13 illustrates a sectioned view of a mounting portion 110 fully buried 176 under a ground surface 204. FIG. 14 illustrates a sectioned view of a mounting portion 110 partially buried 178 under a ground surface 204. The depth of mounting portion 110 is adjustable and can be determined by shapes and requirements of assembly 100.

Those skilled in the art will recognize that excavation beneath the ground to form subterranean position of assembly 100 is a costly endeavor. However, because of the telescoping mechanism of the individual deployable modules 112*a*-*c*, the excavation beneath the ground surface 204 is only half the maximum height achieved by assembly 100. This is because the modules 112*a*-*c* fit into each other in subterranean position.

In some embodiments, mounting portion 110 may be operational completely above the ground surface 204 to fasten to an existing structure 180. FIGS. 15A and 15B illustrates a side view of a mounting portion 110 fastened to an existing structure 180, such as a dam. FIG. 15A shows the base module 102 joined with the existing structure 180, and FIG. 15B shows the studs 142*a*, 142*b* securing the base module 102 to the dam.

In addition to fastening to an existing structure 180, base module 102 may also rotate up to 360°. FIG. 16 illustrates a sectioned view of a base module 102 rotating, such that the deployable modules 112*a*, 112*b*, 112*c* extend and retract horizontally or vertically. Base module 102 may operate from any number of orientations.

Looking back at FIG. 4, assembly 100 may further include a plurality of deployable modules 112*a*, 112*b*, 112*c* arranged in a nested configuration in relation to each other and the base module 102. The deployable modules 112a-c are configured to slide vertically with respect to the other, so as to extend to a deployed position 200 and retract into a collapsed position 202. The nested configuration of deployable modules 112a-c has an innermost deployable module that is the smallest and most inner deployable module. Base module 102 is the outermost module, encapsulating the deployable modules 112a-c.

Deployable modules 112a, 112b, 112c comprise a continuous deployable sidewall 116a, 116b, 116c. Deployable sidewall 116a, 116b, 116c is defined by an inner surface 118, an outer surface 120, a deployable cavity 114, and at least one terminal opening 152e, 152f, 152g, 152h, 152i, 152k, 152l. During displacement of deployable modules 112a, 112b, 112c, inner surface 118 of each deployable module 112a slidably engages an outer surface of an adjacent module 112b. Further, deployable modules 112a-c are scalable and may follow a generally rectangular shape, straight shape, or a curved shape.

In some embodiments, assembly 100 may include a plurality of guide rails 136 disposed on the inner surface 118 of each deployable sidewall 116a, 116b, 116c. Guide rails 136 are configured to engage the outer surface 120 of an adjacent deployable module 112b, such that the deployable modules 112a-c remain aligned while being displaced between the deployed position 200 and the collapsed position 202. Guide rails 136 may serve to strengthen the sidewalls when the external forces are such that the constituent material of the sidewalls does not provide enough strength.

As illustrated in FIG. 4, deployable modules 112a-c have generally incrementally decreasing sizes, so as to fit into each other in the stacked arrangement. However, if the plurality of deployable modules 112a-c and the base module 102 need not to have the same level in the collapsed position 202, the deployable modules 112a-c can have equal height. Deployable modules 112a-c are sized and dimensioned to telescope relative to each other, and also relative to base module 102.

In some embodiments, deployable modules 112a-c may be configured to maintain the tight tolerance while in the deployed position 200. The generally tight tolerance between deployable modules 112a-c is possible because of sealed interconnections between each deployable module 112a-c. This sealed interconnection optimizes the restriction of liquid passage through modules 102, 112a-c.

In the subterranean position, deployable modules 112a-c retract into each other, forming a snug fit with a tight tolerance. In the deployed position 200, the deployable modules 112a-c are configured to extend to a deployed position 200, and form a sealed wall that restricts passage of liquid and resisting lateral forces generated by liquid in flood conditions.

The materials for the base module 102 and deployable modules 112a-c are generally lightweight. Sufficient elevation of the barrier requires it to be manufactured from lightweight materials, so as to maximize the axial displacement forces. Suitable materials for the modules may include, without limitation, reinforced concrete, steel, aluminum, Kevlar, asphalt, wood, clay, plastic, mortar, cement, concrete, sand, bricks, and a natural or artificial fiber.

Figures 17, 18:
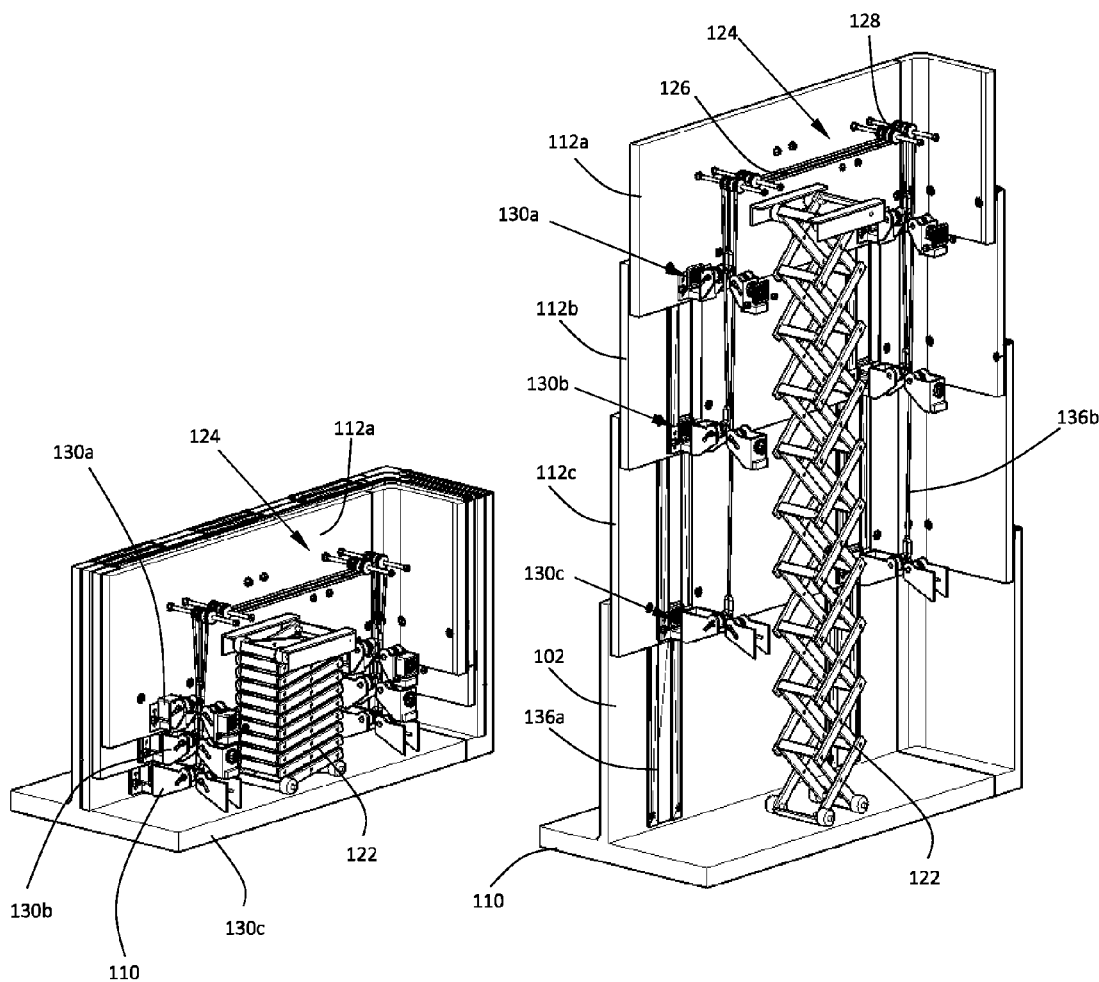
FIG. 17 illustrates a sectioned view of a base module having a lifting device with the deployable modules in a collapsed position, in accordance with an embodiment of the present invention.
FIG. 18 illustrates a sectioned view of a base module having a lifting device shown in FIG. 17 axially displacing the deployable modules to a deployed position, in accordance with an embodiment of the present invention.

Looking now at FIGS. 17 and 18, assembly 100 may include a lifting device 122 extending between the base module 102 and the innermost deployable module. Lifting device 122 is configured to apply an axial force to the innermost deployable module, so as to enable telescoping extension of the plurality of deployable modules 112a-c relative to the base module 102. In one embodiment, the lifting device 122 is a scissor lifting mechanism. Various means may be used to actuate lifting device 122, including, without limitation, hydraulic power, pneumatic power, mechanical power, and muscular power. In one embodiment, a crane may be used. In another embodiment, an electric motor may be used.

Turning now to FIG. 19, assembly 100 may include a pair of spring biased lateral support members 130a, 130b, 130c that are operational with each deployable sidewall 116a, 116b, 116c of deployable modules 112a-c, or the base sidewall 104 of the base module 102, or both. Thus, multiple sets of spring biased lateral support members 130a-c are operational with deployable sidewalls 116a, 116b, 116c and the base module 102.

Spring biased lateral support members 130a-c are biased to expand from the at least one terminal opening 152a-d from the deployable sidewall 116a, 116b, 116c as each deployable module 112a-c extends to the deployed position 200. Pair of spring biased lateral support members 130a-c may also be compressed into the at least one terminal opening 152a-d as each deployable module 112a-c retracts to the collapsed position 202.

Similarly, pair of spring biased lateral support members 130a-c are biased to expand from the at least one base terminal opening 152e-1 of the base sidewall 104 as the base module 102 extends to the deployed position 200. Spring biased lateral support members 130a-c may also be compressed into the at least one base terminal opening 152e-1 as each deployable module 112a-c retracts to the collapsed position 202.

In one embodiment, pair of spring biased lateral support members 130a, 130b, 130c are disposed opposite each other in alignment on the inner surface 118 of each deployable modules 112a-c. Spring biased lateral support members 130a-c comprise a spring 132 and a spring conduit 134.

Figure 23:
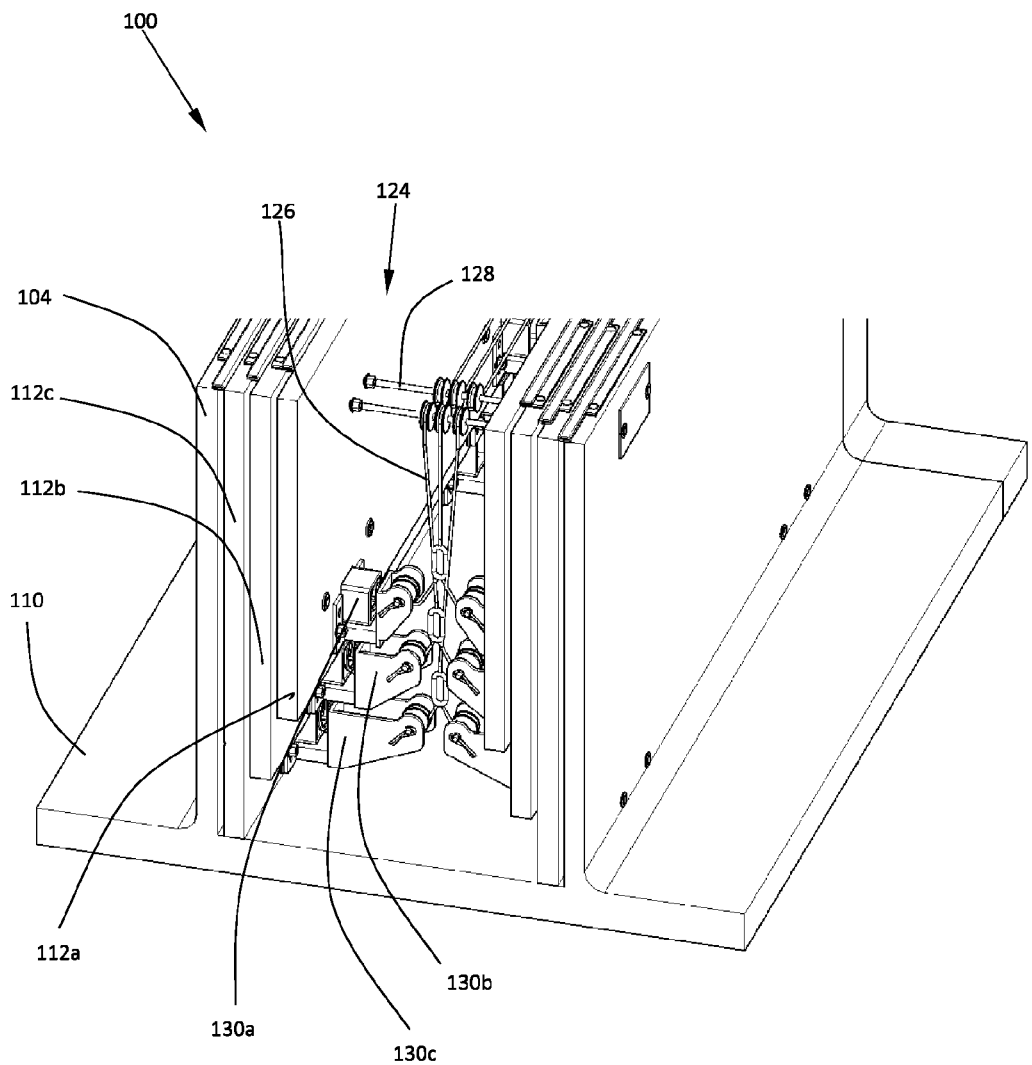
FIG. 23 illustrates a perspective view of a base module having a spring biased lateral support member with the deployable modules in a collapsed position, in accordance with an embodiment of the present invention.

FIG. 19 illustrates a sectioned perspective view of a base module 102 having a spring biased lateral support member 130a with the deployable modules 112a-c in a collapsed position 202. FIG. 20 illustrates a sectioned perspective view of base module 102 having a spring biased lateral support member 130a axially displacing the deployable modules 112a-c to a deployed position 200. Here, spring 132 passes through at least one base terminal opening 152a, 152b, 152c, 152d in base sidewalls 104. Openings 152a-d form a nook for spring to rest in when compressed, as shown in FIG. 23. Similarly, spring 132 passes through at least one terminal opening 152a-1 in deployable sidewalls 104. Spring is compressed from the weight of an adjacent, upper module 112a collapsing on the lower module 112b. This creates a controlled collapse. Also, pulley system 124 slows rate of collapse to further enhance stability.

Figures 21, 22:
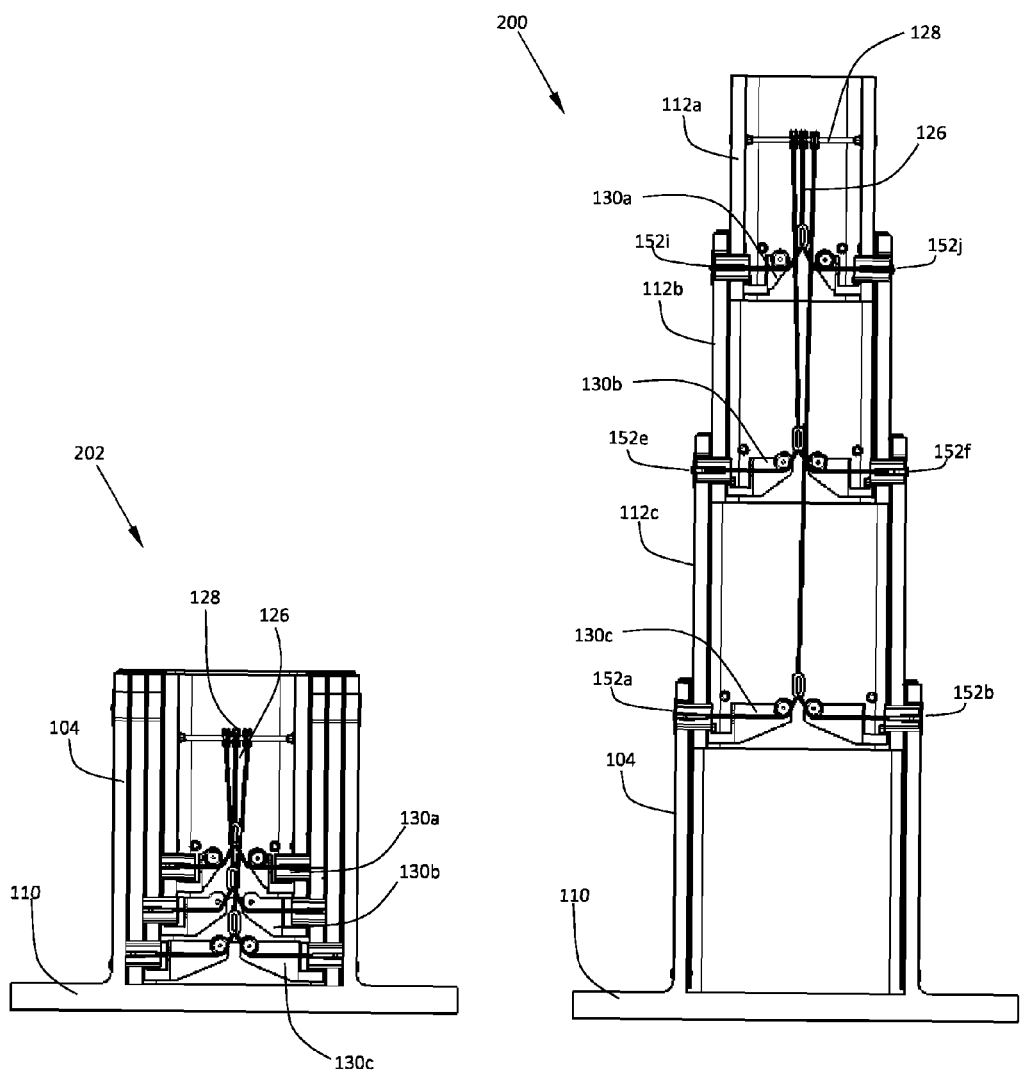
FIG. 21 illustrates a sectioned side view of a base module having a spring biased lateral support member with the deployable modules in a collapsed position, in accordance with an embodiment of the present invention.
FIG. 22 illustrates a sectioned side view of a base module having a spring biased lateral support member shown in FIG. 19 axially displacing the deployable modules to a deployed position, in accordance with an embodiment of the present invention.

FIG. 21 illustrates a sectioned side view of a spring biased lateral support member 130a-c having deployable modules 112a-c in a collapsed position 202. FIG. 22 illustrates a sectioned side view of a base module 102 having a spring biased lateral support member 130a-c that is axially displacing the deployable modules 112a-c to a deployed position 200.

Figure 24A:
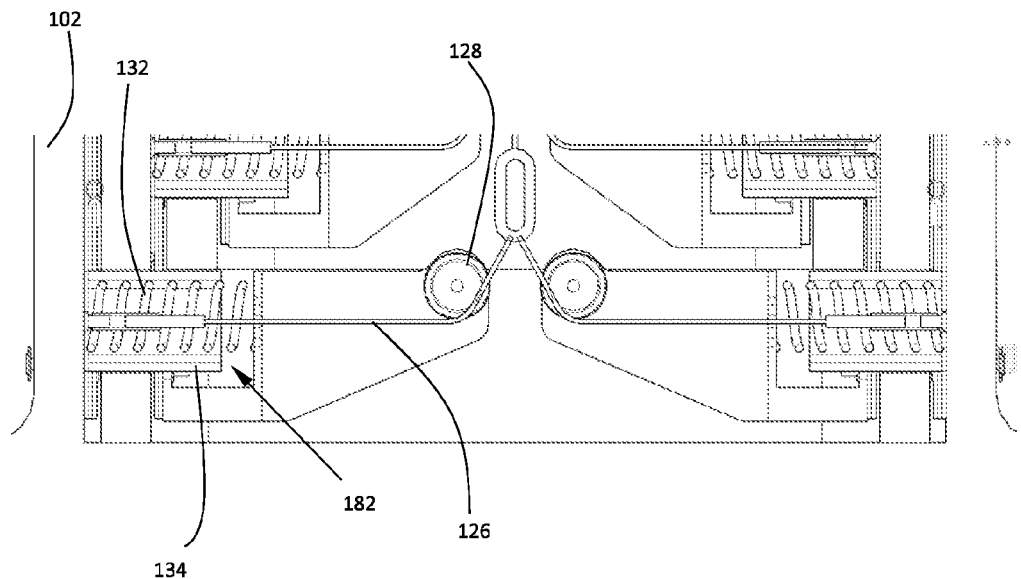
FIGS. 24A and 24B illustrates sectioned side views of a spring biased lateral support member, where
Figure 24B:
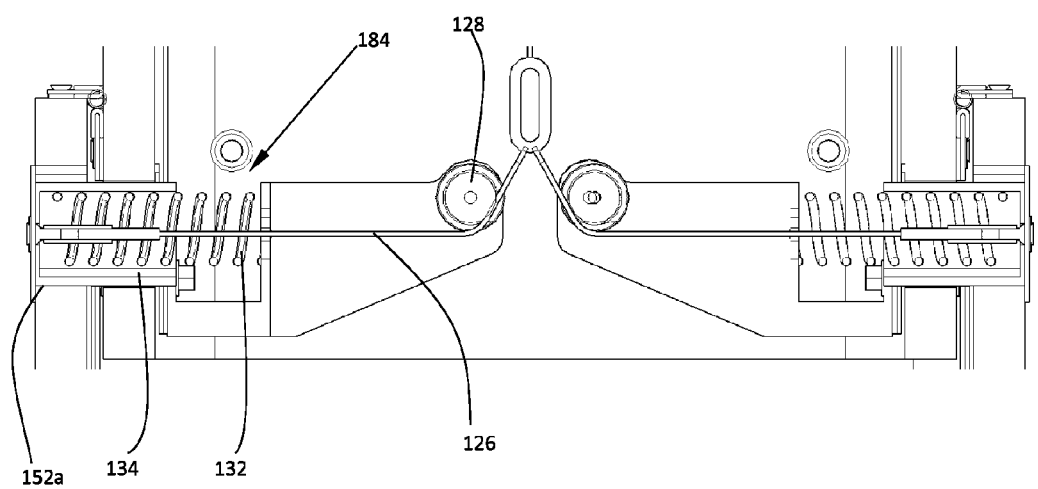

In one embodiment, spring 132 is configured to generate a tensioned force outwardly from the inner surface of the deployable sidewall. Spring 132 is also configured to be compressed between adjacent deployable modules 112a, 112b, 112c. For example, FIGS. 24A and 24B illustrates sectioned side views of a spring biased lateral support member 130a, where FIG. 24A shows a spring 132 in a compressed position 182, and FIG. 24B shows spring 132 in an expanded position 184, and thereby helping to pull deployable modules 112a-c to deployed position 200.

As each deployable module 112a-c extends to the deployed position 200, spring 132 is biased to expand from the inner surface 118 of the deployable sidewall 116a, 116b, 116c. Conversely, as each deployable module 112a-c retracts to the collapsed position 202, the spring 132 is compressed by an outer deployable module 112c towards the inner surface 118 of the deployable sidewall 116a, 116b, 116c. It is also significant to note that each deployable module 112a-c has a unique cable 126 and pulley portion 128 that operatively connect to the spring biased lateral support member 130a-c of each deployable module. In this manner, deployable modules 112a-c extend and retract incrementally.

In some embodiments, assembly 100 may include a pulley system 124 that is operational with the deployable modules to compress and release the pair of spring biased lateral support members 130a-c. Pulley system 124 works to support deployable modules 112a-c in the deployed position 200, and releases deployable modules to the collapsed position 202. Pulley system 124 may include a pulley portion 128 and at least one cable 126. Pulley portion 124 may include a series of pulleys arranged in a parallel disposition and extending between the deployable sidewall of the innermost deployable sidewall 112a. The at least one cable 126 may include a cable that is operational for each deployable module.

In some embodiments, pulley system 124 supports the weight of the plurality of deployable modules 112a-c in the deployed position 200. Pulley system 124 may also be configured to release the plurality of deployable modules towards the collapsed position 202. Thus, the release of the deployable modules into each other in the nested configuration compresses the pair of spring biased lateral support members 130a, 130b, 130c into the at least one terminal opening 152a-d and the at least one base terminal opening 152e-1. Consequently, compression of the pair of spring biased lateral support members 130a-c releases tension from the at least one cable 126 to release the plurality of deployable modules to the collapsed position 202.

In one embodiment, multiple cables 126 assigned to each deployable module 112a, 112b, 112c are pulled one by one such that deployable modules 112a-c are retracted to the collapsed position 202 one by one, incrementally. FIG. 23 shows the manually operated version of the assembly 100 in this incrementally extending capacity.

In another embodiment, a step motor controls the sequence of pulling the cables, by doing so, the retraction operation of the deployable modules 112a-c to the collapsed position 202 can be controlled remotely. Conversely, when extending the deployable modules 112a-c to the deployed position 200, the components of the lifting device 122 that are not manually operated may contain a set of gears and pulleys connected to a step motor through a rotating shaft.

In some embodiments, assembly 100 may include at least one inner sealing member 138a, 138b, 138c disposed between the inner surface of each deployable module. Inner sealing member 138a, 138b, 138c is configured to position between two or more adjacent deployable modules 112a, 112b. FIG. 25 illustrates a close up view of an exemplary inner sealing member 138a, 138b, 138c between modules in a collapsed position 202. Looking closer at inner sealing member 138a, 138b, 138c, FIG. 26 illustrates a close up view of the inner sealing member 138a, 138b, 138c expanded between modules that are in a deployed position 200.

In one exemplary embodiment, inner sealing member 138a, 138b, 138c is a bulb gasket that is connected to the outer surface of the deployable modules 112a, 112b, 112c. When a deployable module 112a reaches its extended configuration, the bulb gasket is pressed against another bulb gasket that is attached to the top edge of the adjacent deployable modules 112a-c or base module 102. When bulb gasket is located at the outer surface is pushed against the bulb gasket located at the top, a seal is created so the seepage of water is prevented or reduced.

Figure 27:
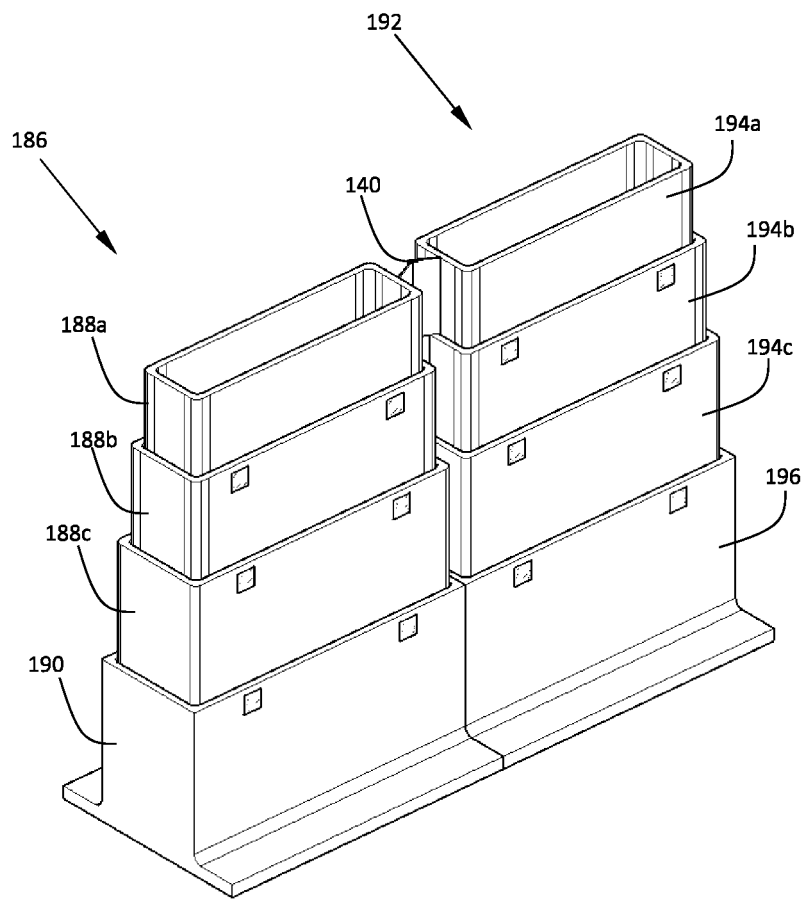
FIG. 27 illustrates a perspective view of an exemplary outer sealing member expanded between adjacent telescoping barrier assemblies, in accordance with an embodiment of the present invention.

In some embodiments, the assembly 100 may include an outer sealing member 140 disposed between the outer surface of each deployable module. The outer sealing member 140 configured to position between two or more adjacent assemblies. FIG. 27 illustrates a perspective view of an exemplary outer sealing member 140 expanded between adjacent telescoping barrier assemblies 186, 192.

Figure 28:
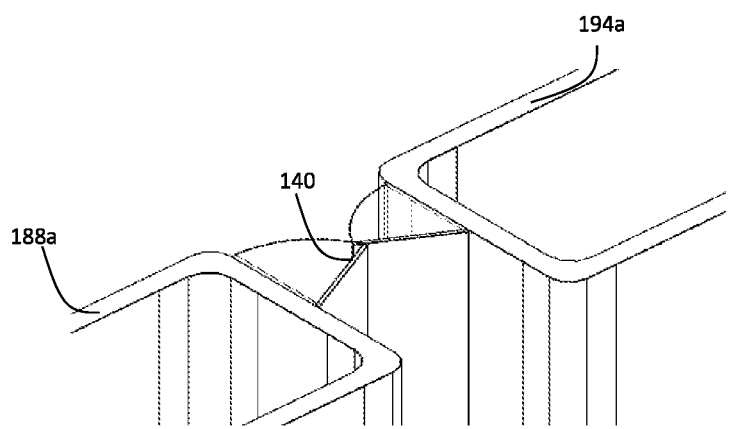
FIG. 28 illustrates a close up view of an outer sealing member expanded between adjacent telescoping barrier assemblies, in accordance with an embodiment of the present invention.

Outer sealing member 140 inhibits passage of a liquid between a first telescoping barrier assembly 186 and a second telescoping barrier assembly 192. Outer sealing member 140 may position between a first based module 190 and a second base module 196. Outer sealing member 140 may also position between a plurality of first deployable modules 188a, 188b, 188c, and a plurality of second deployable modules 194a, 194b, 194c. In this manner, leakage from a flood can be blocked through use of any number of barrier assemblies. FIG. 28 illustrates a close up view of an outer sealing member 140 expanded between adjacent telescoping barrier assemblies 186, 192.

Those skilled in the art will recognize that when two telescopic barrier assemblies 186, 192 are installed next to each other, a gap may form between the deployable modules 188a-c, 194a-c. The gap can be covered by positioning the outer sealing member 140 between modules 188a-c, 194a-c. In one embodiment, outer sealing member 140 may include a sealing plate that is installed manually by sliding down through guide rails located at the inner surface of the deployable modules 112a, 112b, 112c.

One example of outer sealing member 140 is a sealing plate shown in FIG. 28. Sealing plate may represents a manual solution where the plate is slide in manually. Other version covers the possibility of having the gap sealed by means of plates that deploy laterally as the deployable modules 188a-c, 194a-c reach the extended position. These sealing plates are pushed by springs attached to the deployable modules 188a-c, 194a-c. The sealing plates extend until they enter in contact with the sealing plates of the laterally adjacent telescopic wall. In one embodiment, the sealing plates have rubber gasket all around their edges so when they are being pressed against the other sealing plate, a secure sealing is created so the seepage of water is prevented or reduced.

In yet another embodiment, assembly 100 may include a sensor 199 configured to actuate the lifting device upon detection of an event. The event may include a flood, whereby the deployable modules 112a, 112b, 112c are axially displaced by the lifting device 122 and lateral support members 130a-c to the deployed position 200. Sensor 199 may include, without limitation, a motion detector, a temperature detector, an infrared light, a pressure sensor, and a light intensity detector.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. A telescoping barrier assembly, the assembly comprising:
   a base module comprising a mounting portion and a continuous base sidewall, the base sidewall defined by at least one base terminal opening and a base cavity;
   a plurality of deployable modules comprising a continuous deployable sidewall, the deployable sidewall defined by a deployable cavity, an inner surface, an outer surface, and at least one terminal opening, the plurality of deployable modules arranged in a nested configuration, the plurality of deployable modules configured to slide vertically with respect to each other, so as to extend to a deployed position and retract into a collapsed position;
   a lifting device extending between the base module and an innermost deployable module, the lifting device configured to apply an axial force to the innermost deployable module to enable telescoping extension to the deployed position by the plurality of deployable modules, relative to the base module;
   a pair of spring biased lateral support members being operational with the plurality of deployable sidewalls and the base module,
   the pair of spring biased lateral support members being biased to expand from the at least one terminal opening from the deployable sidewall as each deployable module extends to the deployed position, the pair of spring biased lateral support members further being compressed into the at least one terminal opening as each deployable module retracts to the collapsed position,
   the pair of spring biased lateral support members further being biased to expand from the at least one base terminal opening from the base sidewall as the base module extends to the deployed position, the pair of spring biased lateral support members further being compressed into the at least one base terminal opening as each deployable module retracts to the collapsed position; and
   a pulley system comprising a pulley portion and at least one cable, the pulley system configured to support a weight of the plurality of deployable modules in the deployed position,
   the pulley system further configured to release the plurality of deployable modules towards the collapsed position,
   whereby release of the plurality of deployable modules into each other compresses the pair of spring biased lateral support members into the at least one terminal opening and the at least one base terminal opening,
   whereby compression of the pair of spring biased lateral support members releases tension from the at least one cable to release the plurality of deployable modules to the collapsed position.

2. The assembly of claim 1, wherein the base module and the plurality of deployable modules are fabricated from at least one of the following: reinforced concrete, steel, aluminum, Kevlar, asphalt, wood, clay, plastic, mortar, cement, concrete, sand, bricks, and a natural or artificial fiber.

3. The assembly of claim 1, wherein the base module and the plurality of deployable modules and the pair of spring biased lateral support members include at least one of the following shapes: rectangular, circular, oval, square, and hexagonal.

4. The assembly of claim 1, further comprising a cylindrical base module having a cylindrical mounting portion and a plurality of cylindrical deployable modules.

5. The assembly of claim 1, further comprising a curved base module having a curved mounting portion and a plurality of curved deployable modules.

6. The assembly of claim 1, further comprising at least one stud configured to fasten the mounting portion to the base sidewall.

7. The assembly of claim 1, wherein the mounting portion comprises a top slab disposed on the base module.

8. The assembly of claim 1, wherein the base module comprises at least one of the following: a tapered sidewall, a thickened sidewall, a symmetrical mounting portion, an asymmetrical mounting portion, a wedge shaped mounting portion, and a mounting portion having two piles.

9. The assembly of claim 1, wherein the deployable sidewall comprises at least one aperture.

10. The assembly of claim 1, wherein the sizes of the plurality of deployable modules incrementally decrease or remain the same.

11. The assembly of claim 1, wherein the lifting device is a scissor lift mechanism, the scissor lift mechanism being operable through at least one of the following: hydraulic power, pneumatic power, mechanical power, and muscular power.

12. The assembly of claim 1, wherein the pair of spring biased lateral support members comprise a spring and a spring conduit, the spring configured to generate a tensioned force against an elastic deformation, thereby causing a tension on the cable.

13. The assembly of claim 1, wherein the pair of spring biased lateral support members are disposed opposite each other on the inner surface of each deployable sidewall.

14. The assembly of claim 1, wherein the pulley portion comprises a series of pulleys arranged in a parallel disposition and extending between the deployable sidewall of the innermost deployable sidewall.

15. The assembly of claim 1, wherein each deployable module has an individual cable for operation.

16. The assembly of claim 1, further comprising a sensor configured to actuate the lifting device upon detection of an event.

17. The assembly of claim 1, further comprising a pair of guide rails disposed on the inner surface of each deployable sidewall, the pair of guide rails configured to engage the outer surface of an adjacent deployable module, whereby the plurality of deployable modules remain aligned while being displaced between the deployed position and the collapsed position.

18. The assembly of claim 1, further comprising at least one inner sealing member disposed between the inner surface of each deployable module, the at least one inner sealing member configured to position between two or more adjacent deployable modules.

19. The assembly of claim 1, further comprising an outer sealing member disposed between the outer surface of each deployable module, the outer sealing member configured to position between two or more adjacent assemblies.

20. A telescoping barrier assembly, the assembly comprising:
   a base module comprising a mounting portion and a continuous base sidewall, the base sidewall defined by at least one base terminal opening and a base cavity;

a plurality of deployable modules comprising a continuous deployable sidewall, the deployable sidewall defined by a deployable cavity, an inner surface, an outer surface and at least one terminal opening, the plurality of deployable modules arranged in a nested configuration, the plurality of deployable modules configured to slide vertically with respect to the other, so as to extend to a deployed position and retract into a collapsed position;

a lifting device extending between the base module and an innermost deployable module, the lifting device configured to apply an axial force to the innermost deployable module to enable telescoping extension to the deployed position by the plurality of deployable modules, relative to the base module;

a pair of spring biased lateral support members being operational with the plurality of deployable sidewalls and the base module, the pair of spring biased lateral support members being biased to expand from the at least one terminal opening from the deployable sidewall as each deployable module extends to the deployed position, the pair of spring biased lateral support members further being compressed into the at least one terminal opening as each deployable module retracts to the collapsed position, the pair of spring biased lateral support members further being biased to expand from the at least one base terminal opening from the base sidewall as the base module extends to the deployed position, the pair of spring biased lateral support members further being compressed into the at least one base terminal opening as each deployable module retracts to the collapsed position;

a pulley system comprising a pulley portion and at least one cable, the pulley system configured to support a weight of the plurality of deployable modules in the deployed position, the pulley system further configured to release the plurality of deployable modules towards the collapsed position, whereby release of the plurality of deployable modules into each other compresses the pair of spring biased lateral support members into the at least one terminal opening and the at least one base terminal opening, whereby compression of the pair of spring biased lateral support members releases tension from the at least one cable to release the plurality of deployable modules to the collapsed position;

a sensor configured to actuate the lifting device upon detection of an event;

a pair of guide rails disposed on the inner surface of each deployable sidewall, the pair of guide rails configured to engage the outer surface of an adjacent deployable module, whereby the plurality of deployable modules remain aligned while being displaced between the deployed position and the collapsed position;

an inner sealing member disposed between the inner surface of each deployable module, the inner sealing member configured to position between two or more adjacent deployable modules; and an outer sealing member disposed between the outer surface of each deployable module, the outer sealing member configured to position between two or more adjacent assemblies.

\* \* \* \* \*